United States Patent

Ohtake et al.

[11] Patent Number: 5,887,202
[45] Date of Patent: Mar. 23, 1999

[54] LENS CONTROLLING DEVICE AND METHOD FOR LENS SYSTEM WITH VARIABLE FOCAL LENGTH

[75] Inventors: Motoyuki Ohtake, Saitama; Koichi Ohshita, Tokyo, both of Japan

[73] Assignee: Nikon Corporation, Tokyo, Japan

[21] Appl. No.: 921,320

[22] Filed: Aug. 29, 1997

Related U.S. Application Data

[63] Continuation of Ser. No. 520,091, Aug. 28, 1995, abandoned.

[30] Foreign Application Priority Data

Aug. 26, 1994 [JP] Japan .................................. 6-225646

[51] Int. Cl.⁶ .................................................. G03B 13/36
[52] U.S. Cl. ............................................. 396/86; 396/82
[58] Field of Search ................................ 396/79, 82, 86

[56] References Cited

U.S. PATENT DOCUMENTS

| | | | |
|---|---|---|---|
| 5,181,061 | 1/1993 | Kawasaki et al. | 396/82 |
| 5,422,699 | 6/1995 | Sato et al. | 396/82 |
| 5,448,413 | 9/1995 | Kobayashi et al. | 396/82 |
| 5,570,155 | 10/1996 | Shibayama | 396/82 |
| 5,570,236 | 10/1996 | Hirasawa | 396/86 |

FOREIGN PATENT DOCUMENTS

A-62-284317  12/1987  Japan .
A-5-113533   5/1993   Japan .

*Primary Examiner*—Safet Metjahic
*Assistant Examiner*—Michael Dalakis
*Attorney, Agent, or Firm*—Oliff & Berridge, PLC

[57] ABSTRACT

A position controlling device in a lens system with a variable focal length with high-precision focusing having a small amount of required recorded information, even when there are large number of divisions of the object distance and of the focal length includes a distance measuring device that detects the object position and transmits photographic distance information. A detecting device detects the movement amount from a standard position of the movable lens group of the lens system when the focal length of the lens system changes. A calculating device calculates the required movement of the focusing lens unit of the lens system, based on the photographic distance information and the movement amount of the movable lens unit. Finally, a controlling device drives the focusing lens unit and performs focusing, based on the required movement calculated by the calculating device. The movable lens unit moves monotonically to the object side or to an image side when the focal length of the lens system is changed. In this manner, the focusing movement required increases monotonically and gradually when the focal length of the lens system changes from the wide-angle end to the telephoto end for a given photographic distance.

29 Claims, 4 Drawing Sheets

LENS CONTROLLING DEVICE AND METHOD FOR LENS SYSTEM WITH VARIABLE FOCAL LENGTH

This is a continuation of application Ser. No. 08/520,091 filed Aug. 28, 1995 now abandoned.

BACKGROUND OF THE INVENTION

1. Field of the Invention

The present invention relates to a position controlling device of a lens system with a variable focal length. Specifically, the present invention relates to a position controlling device for the focusing lens group of auto-focus cameras with a built-in inner focus-style or rear focus-style zoom lens.

2. Description of Related Art

In recent years, zoom lenses (lens systems with a variable focal length) and auto-focus functions are generally used on SLR cameras and video cameras. These zoom lenses can focus by scrolling the entire unit. Alternatively, zoom lenses using so-called rear focus methods or inner focus methods move or scroll one lens group among the movable lens groups that form the lens system. For these types of zoom lenses, the movement of the focusing lens group (the lens group that moves along the optical axis during the focusing action) is based on the photographic distance and the focal length of the lens system. Thus, the movement of the focusing lens group changes with focal length for the same photographic distance.

Therefore, most of these zoom lenses use a so-called stepped zoom lens where the focal length range is divided into multiple narrow focal length ranges and in which the focal length is not continuous. Stepped zoom lens methods determine the movement of the focusing lens group for the photographic distance at each focal length range.

The movement of the focusing lens group according to the photographic distance at each focal length range can be found by (1) recording a table of the movement amount of the focusing lens group that corresponds to a photographic distance or (2) recording the relationship of For example, in Laid Open Japanese Unexamined Patent Application 62-284317, the movement amount of the focusing lens group at each focal length range for a given photographic distance is stored in advance in a memory. In Laid Open Japanese Unexamined Patent Application 5-113533, a fixed coefficient corresponding to each focal length range is preset in memory and the movement amount of the focusing lens group is calculated based on the photographic distance and the fixed coefficient.

However, in Laid Open Japanese Unexamined Patent Application 62-284317, required memory increases drastically when the focus precision is increased by increasing the stopping positions of the focusing lens group between the infinite focus position and the close-range focus position.

Also, in Laid Open Japanese Unexamined Patent Application 5-113533, the zoom lens focal length range is divided into multiple ranges, and a fixed coefficient is stored for each focal length range. This method is limited to specific focal length ranges that exist intermittently, or in other words, to stepped zoom lens functions. For such stepped zoom lens functions, if the number of zoom lens focal length range divisions is increased for zoom lenses with high zoom ratio, the number of fixed coefficients increases, and the required amount of memory must also increase.

SUMMARY OF THE INVENTION

The present invention provides a position controlling device of a lens system with a variable focal length where the required amount of recorded information is small, even for high precision focusing that requires many divisions of the focal length range and photographic distance.

The above-described problems are resolved by a position controlling device of a lens system with a variable focal length that includes a distance measuring device, a detecting device, a movable lens unit (movable lens group), a calculating device, a focusing lens unit (focusing lens group) and a controlling device. The distance measuring device detects the position of the photographic object (also known as a photographic subject) and transmits photographic distance information. A detecting device detects the movement amount from a standard position of the movable lens unit of a variable power optical system, when the focal length of the lens system changes. A calculating device calculates the required movement amount of the focusing lens unit based on the photographic distance information from the distance measuring device and the movement amount of the movable lens unit from the detecting device. A controlling device drives the focusing lens unit based on the movement amount calculated by the calculating device to focus the camera.

The calculating device calculates the required movement of the focusing lens unit to focus the camera using Formula 2.

$$\gamma = \Sigma_i \Sigma_j a_{ij} (1/R)^i \delta^j (i=1,2,3,\ldots, j=0,1,2,\ldots) \qquad (2)$$

In Formula 2, R is the photographic distance information; $\delta$ is the movement amount of the movable lens unit from a standard position; a is a fixed coefficient; and $\gamma$ is the required movement of the focusing lens unit.

To summarize the position controlling device of a lens system with a variable focal length operations, a calculating device calculates the required movement of the focusing lens unit, based on the photographic distance obtained from the distance measuring device and the movement amount of the movable lens unit obtained from the detecting device. The required movement of the focusing lens unit can be directly calculated by simply inputting the photographic distance and movement amount of the movable lens unit into a prerecorded formula, for example, in the calculating device.

Thus, high-precision focusing is performed with a small amount of recorded information, even when the number of divisions of the focal length range and of the photographic distance is increased. of divisions of the focal length range and of the photographic distance is increased.

Other objects, advantages and salient features of the invention will become apparent from the detailed description taken in conjunction with the annexed drawings, which disclose preferred embodiments of the invention.

BRIEF DESCRIPTION OF THE DRAWINGS

The invention will be described with reference to the following drawings in which like reference numerals refer to like elements and wherein.

DETAILED DESCRIPTION OF PREFERRED EMBODIMENTS

Figure 1:
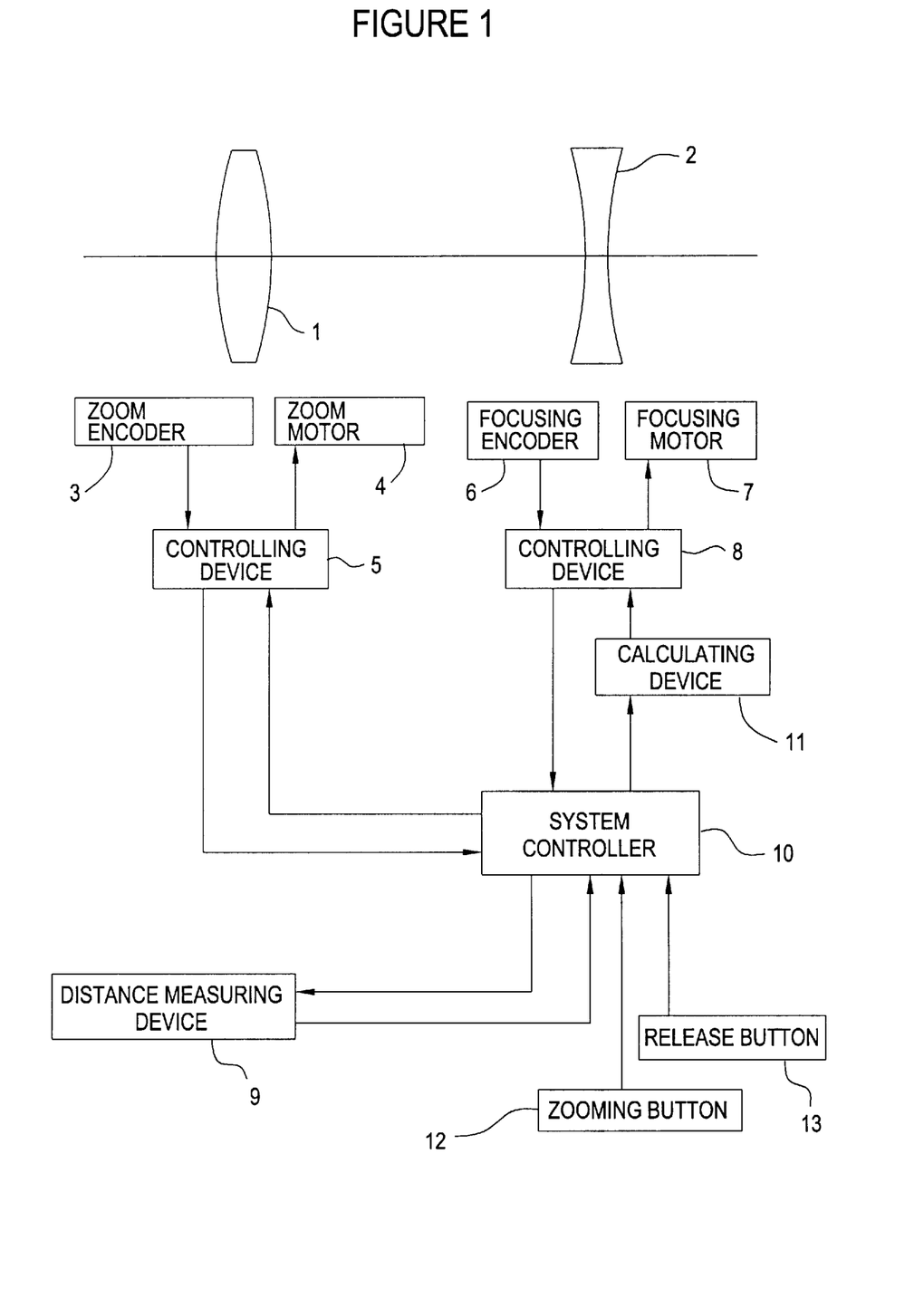
FIG. 1 is a block diagram showing a position controlling device of a lens system with a variable focal length according to the disclosed embodiments of the present invention.

FIG. 1 is a block diagram showing the structure of the position controlling device of a lens system with a variable focal length according to the disclosed embodiments of the present invention.

The position controlling device of a lens system with a variable focal length has a lens system with a variable focal length that includes a movable lens unit 1 that moves along the optical axis when the focal length of the lens system changes and a focusing lens unit 2 that group or unit can include one or more lens elements as defined herein.

Zoom encoder 3 detects the movement amount of the movable lens unit 1 and the focusing encoder 6 detects the amount of movement of the focusing lens unit 2. Controlling device 5 controls a zoom motor 4 that drives the movable lens unit 1 along the optical axis. A controlling device 8 controls a focus motor 7 that drives the focusing lens unit 2 along the optical axis.

As shown in FIG. 1, the position controlling device of a lens system with a variable focal length also includes a distance measuring device 9, a calculating device 11, and a system controller 10 that controls the entire lens system. The distance measuring device 9 receives distance measuring commands from the system controller 10 to detect the position of the object and outputs the photographic distance information to the calculating device 11. The calculating device 11 calculates the required movement of the focusing lens unit 2 based on the lens position information and photographic distance information. The system controller 10 controls the zooming action, which changes the focal length of the lens system, based on the operation of the zooming button 12. The system controller 10 controls the lens system focusing action based on the operation of the release button 13.

First, the system controller 10 begins the zooming operation when the zooming button 12 is depressed. A signal corresponding to the amount of zoom movement is transmitted from the system controller 10 to the controlling device 5. The controlling device 5 moves the movable lens unit 1 by the signalled zoom amount along the optical axis through the zooming motor 4.

At this point, the movement amount of the movable lens unit 1 is detected by the zoom encoder 3. As described below, the detected movement amount of the movable lens unit 1 is transmitted to the system controller 10 through the controlling device 5. The system controller 10 records the corresponding movement amount $\delta$, which is the movement amount of the movable lens unit 1 from a standard position.

The focal length f of the lens system can be expressed by approximation Formula (1), based on the movement amount $\delta$ of the movable lens unit 1 from a standard position and a fixed coefficient, $b_j$.

$$f = b_i \delta^i \quad (i = 0, 1, 2, \ldots) \tag{1}$$
$$= b_0 + b_1 \delta^1 + b_2 \delta^2 + \ldots$$

The focusing action will now be described. The system controller 10 begins the focusing action when the release button 13 is released. The system controller 10 obtains the movement amount $\delta$ of the movable lens unit 1 from the controlling device 5 that was detected by the zoom encoder 3. The system controller 10 outputs a distance measuring command to the distance measuring device 9 and receives the object position information (e.g., the photographic distance information $\alpha$), from the distance measuring device 9. The photographic distance information $\alpha$ can be just the photographic distance value obtained in the distance measuring device 9. Alternatively, the photographic distance information $\alpha$ can be a related photographic distance value, such as the reciprocal of the photographic distance.

The movement amount $\delta$ of the movable lens unit 1 and the photographic distance information $\alpha$ of the object are transmitted from the system controller 10 to the calculating device 11. In the calculating device 11, the movement amount $\delta$ and the photographic distance information $\alpha$ are substituted into a pre-recorded formula to calculate the required focusing movement amount $\gamma$ (gamma). The calculated focusing movement amount $\gamma$ is transmitted to the controlling device 8 that drives the focusing lens unit 2 by the transmitted amount along the optical axis through the focus motor 7 to complete the focusing action.

The focusing movement amount $\gamma$ is calculated from the movement amount $\delta$ of the movable lens unit 1. Therefore, preferably the movable lens unit 1 moves monotonically to the object side or to the image side when the focal length of the lens system is changed. That movement allows $\gamma$ to be reliably calculated from $\delta$.

To reduce approximation Formula 1 and to reduce the recorded information necessary to control the lens system, preferably the focusing movement amount $\gamma$ increases monotonically and gradually when the focal length of the lens system changes from the wide-angle end (maximum wide-angle state) to the telephoto end (maximum telephoto state) for each photographic distance.

In a position controlling device of a lens system with a variable focal length of the disclosed embodiments, the movement amount $\delta$ and the photographic distance information $\alpha$ are substituted into approximation Formula (2) to calculate-the focusing movement amount y of the focusing lens unit 2. In Formula (2), $a_{ij}$, is a fixed coefficient and $\alpha$ is the reciprocal of the photographic distance information.

$$\begin{aligned}\gamma &= \Sigma\Sigma a_{ij}\alpha^i\delta^j \quad (i = 1, 2, 3, \ldots, j = 0, 1, 2, \ldots) \\ &= (a_{10} + a_{11}\delta + a_{12}\delta^2 + \ldots) * \alpha^1 + \\ &\quad (a_{20} + a_{21}\delta + a_{22}\delta^2 + a_{23}\delta^3) * \alpha^2 + \ldots\end{aligned} \tag{2}$$

The distance measuring device 9 can be a so-called "active-type" focus detecting device having a different optical axis from that of the lens system. The "active-type" focus detecting device can irradiate infrared light rays toward the object, receive the light rays that return from the object, and determine the object position through triangulation. Alternatively, the distance measuring device 9 can be a so-called "passive-style" focus detecting device. The "passive-style" focus detecting device can receive images of the object from two light receiving systems positioned apart from each other and then determine the object position from the parallax of the images.

In Laid Open Japanese Unexamined Patent Application 5-113533, the focal length is calculated from the movement amount of the movable lens group by using an approximation formula, and the focal length range, which includes this focal length, is determined. Fixed coefficients corresponding to the photographic distance information and to the focal length are substituted into a formula, and the focusing movement amount γ is calculated.

In contrast, the disclosed embodiments of the present invention, the focusing movement amount γ is directly obtained based on the movement amount δ of the movable lens unit 1 and the photographic distance information α, which is a more efficient calculation process.

In addition, the present invention can calculate the focusing movement amount γ using the angle of rotation of the zoom lens barrel (instead of δ) and the photographic distance information α.

Further, if the focusing movement amount γ is calculated from the angle of rotation of the zoom lens barrel, the movable lens unit 1 does not necessarily have to move monotonically to the object side or to the image side when the focal length of the lens system is changed.

Embodiments of the position controlling device of a lens system with a variable focal length according to the present invention are described below for specific lens systems with a variable focal length.

Figure 2:
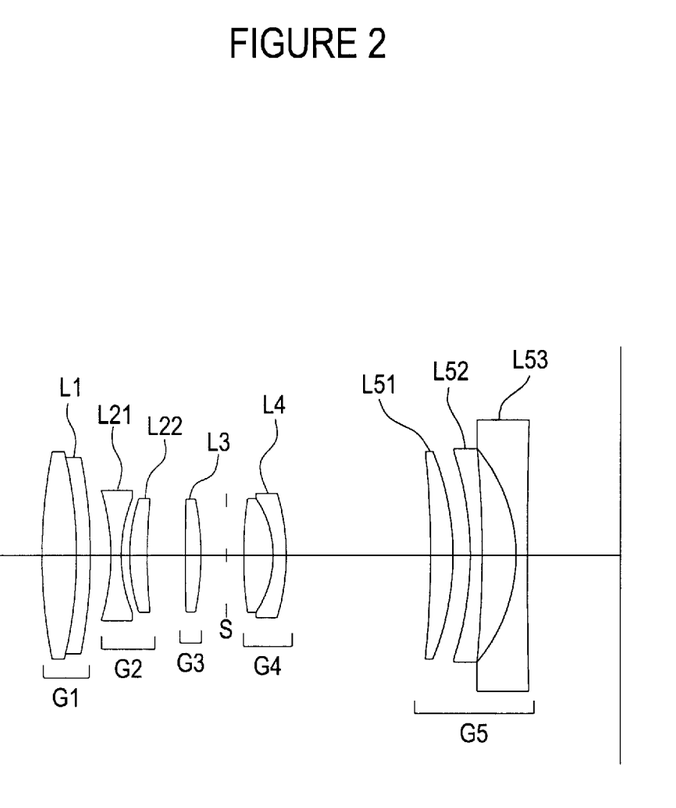
FIG. 2 is a drawing showing the lens structure of the lens system with a variable focal length of a position controlling device according to one embodiment of the present invention.

FIG. 2 is a drawing showing the structure of a lens system with a variable focal length of the position controlling device according to the first embodiment.

In order from the object side, the lens system with a variable focal length of the first embodiment includes a first lens group G1 with a positive refractive power, a second lens group G2 with a negative refractive power, a third lens unit G3 with a positive refractive power, a fourth lens group G4 with a positive refractive power, and a fifth lens group G5 with a negative refractive power. When the focal length of the lens system changes from the wide-angle end to the telephoto end, the lens groups move so that the distance between the first lens group G1 and the second lens group G2 increases, the distance between the second lens group G2 and the third lens unit G3 decreases, the distance between the third lens unit G3 and the fourth lens group G4 increases, and the distance between the fourth lens group G4 and the fifth lens group G5 decreases.

In order from the object side, the first lens group G1 has a compound positive lens component L1 including a biconvex lens and a negative meniscus lens with a concave surface facing the object side. The second lens group G2 includes, in order from the object side, a biconcave lens component L21 and a positive meniscus lens component L22 with a convex surface facing the object side. The third lens unit G3 includes only a biconvex lens component L3. In order from the object side, the fourth lens group G4 has a positive compound lens component L4 including a biconvex lens and a negative meniscus lens with a concave surface facing the object side. The fifth lens group G5 includes, in order from the object side, a positive meniscus lens component L51 with a convex surface facing the image side, a negative meniscus lens component L52 with a concave surface facing the object side, and a negative meniscus lens component L53 with a concave surface facing the object side.

An aperture stops is positioned between the third lens unit G3 and the fourth lens group G4. The aperture stop moves as one piece with the fourth lens group G4 when the focal length of the lens system is changed from the wide-angle end to the telephoto end.

The third lens unit G3 performs the focusing action by moving along the optical axis.

The values of the items of the first preferred embodiment are in Table (1). In Table (1), f is the focal length and Bf is the back focus. The surface number is the order of the lens surface from the object side in the incident light rays direction. The values of the index of refraction and the Abbe number are shown for the d-line ($\lambda$(lambda)=587.6 nm).

TABLE 1

| surface number | radius of curvature | space between surfaces | index of refraction | Abbe number |
|---|---|---|---|---|
| 1 | 45.0525 | 3.893 | 1.51860 | 69.98 |
| 2 | −38.2984 | 1.381 | 1.86074 | 23.01 |
| 3 | −67.7399 | (d3 = variable) | | |
| 4 | −21.1121 | 1.256 | 1.74810 | 52.30 |
| 5 | 18.7929 | 0.879 | | |
| 6 | 18.5014 | 1.884 | 1.86074 | 23.01 |
| 7 | 57.8271 | (d7 = variable) | | |
| 8 | 107.9504 | 1.758 | 1.51860 | 69.98 |
| 9 | −25.8609 | (d9 = variable) | | |
| 10 | ∞ | 1.884 | (aperture stop S) | |
| 11 | 40.0922 | 3.265 | 1.51860 | 69.98 |
| 12 | −10.7240 | 1.507 | 1.80518 | 25.35 |
| 13 | −19.5245 | (d13 = variable) | | |
| 14 | −149.4337 | 2.888 | 1.80518 | 25.35 |
| 15 | −26.0698 | 1.633 | | |
| 16 | −32.9870 | 1.381 | 1.84042 | 43.35 |
| 17 | −169.9714 | 3.767 | | |
| 18 | −16.6274 | 1.5707 | 1.77279 | 49.45 |
| 19 | −294.9845 | Bf | | |

| (variable space at the changing of the focal length of the lens system) | | | | | |
|---|---|---|---|---|---|
| f | d3 | d7 | d9 | d13 | Bf |
| 38.8095 | 2.0894 | 4.0239 | 2.7541 | 15.3353 | 9.5997 |
| 46.7720 | 5.3220 | 3.7448 | 3.0332 | 12.1026 | 14.9147 |
| 54.7394 | 7.7873 | 3.4658 | 3.3123 | 9.6374 | 20.0289 |
| 62.7069 | 9.7383 | 3.1867 | 3.5913 | 7.6864 | 24.9737 |
| 70.6743 | 11.3259 | 2.9076 | 3.8704 | 6.0988 | 29.7730 |
| 78.6418 | 12.6459 | 2.6285 | 4.1495 | 4.7788 | 34.4442 |
| 86.6092 | 13.7620 | 2.3495 | 4.4285 | 3.6627 | 39.0004 |
| 94.5767 | 14.7185 | 2.0704 | 4.7076 | 2.7062 | 43.4518 |
| 102.5441 | 15.4465 | 1.7913 | 4.9866 | 1.8773 | 47.8064 |
| 110.5159 | 16.2726 | 1.5123 | 5.2657 | 1.1521 | 52.0738 |

In Table (2), the focusing movement amounts γ are shown opposite the movement amounts δ of the first lens group G1 for the photographic distances $R=1$ m and $R=2$ m. The movement amounts δ of the first lens group G1 are taken with the wide-angle end as the standard position and with movement toward the object side taken to be positive. The focusing movement amount γ is positive in the image side direction.

TABLE 2

| (Focusing movement amount) | | | |
|---|---|---|---|
| f | δ | γ (R = 2 m) | γ (R = 1 m) |
| 38.8095 | 0.0000 | 0.8644 | 1.7408 |
| 46.7720 | 5.3149 | 1.0377 | 2..0844 |
| 54.7394 | 10.4292 | 1.2088 | 2.4232 |
| 62.7069 | 15.3740 | 1.3775 | 2.7567 |
| 70.6743 | 20.1733 | 1.5434 | 3.0845 |
| 78.6418 | 24.8445 | 1.7061 | 3.4062 |
| 86.6092 | 29.4007 | 1.8653 | 3.7211 |
| 94.5767 | 33.8520 | 2.0208 | 4.0290 |
| 102.5441 | 38.2067 | 2.1721 | 4.3292 |
| 110.5159 | 42.4741 | 2.3193 | 4.6214 |

In the first embodiment, the focusing movement amount γ is calculated using Formula (2) where the movement amount of the first lens group G1 is δ, and the reciprocal (1/R) of the photographic distance R is α. In other words, the focusing movement amount γ is calculated through the approximation Formula (3).

$$\gamma=(a_{10}+a_{11}\delta+a_{12}\delta^{2}+a_{13}\delta^{3})*R^{-1}+(a_{20}+a_{21}\delta+a_{22}\delta^{2}+a_{23}\delta^{3})*R^{-2} \quad (3)$$

$a_{10}=0.171687\times10^{+1}$ $a_{11}=0.646839\times10^{-1}$ $a_{12}=0.217934\times10^{-3}$ $a_{13}=-0.263337\times10^{-5}$ $a_{20}=0.239545\times10^{-1}$ $a_{21}=-0.949514\times10^{-3}$ $a_{22}=-0.338433\times10^{-4}$ $a_{23}=0.562426\times10^{-6}$ As shown in Table (2), on the lens system with a variable focal length of the first embodiment, when the focal length of the lens system changes from the wide-angle end to the telephoto end, the movement amount δ of the first lens group G1 moves monotonically to the object side, and the focusing movement amount γ changes monotonically for each photographic distance. Therefore, the required focusing movement amount γ for the lens system with a variable focal length can be directly and precisely obtained by simply substituting the movement amount δ and the photographic distance R of the first lens group G1 into a simple formula, such as approximation Formula (3).

In Formula (3), a third-order polynomial expression was used for δ, but a first-order, second-order, or higher-order polynomial expression could be used. In Formula (1), a second-order expression was used for 1/R, but a first-order, third-order, or higher-order polynomial expression may also be used.

When the order of the polynomial expressions for δ and R is small, the calculations are faster and use less recorded information. However, higher order polynomial expressions improve the focusing accuracy.

Figure 4:
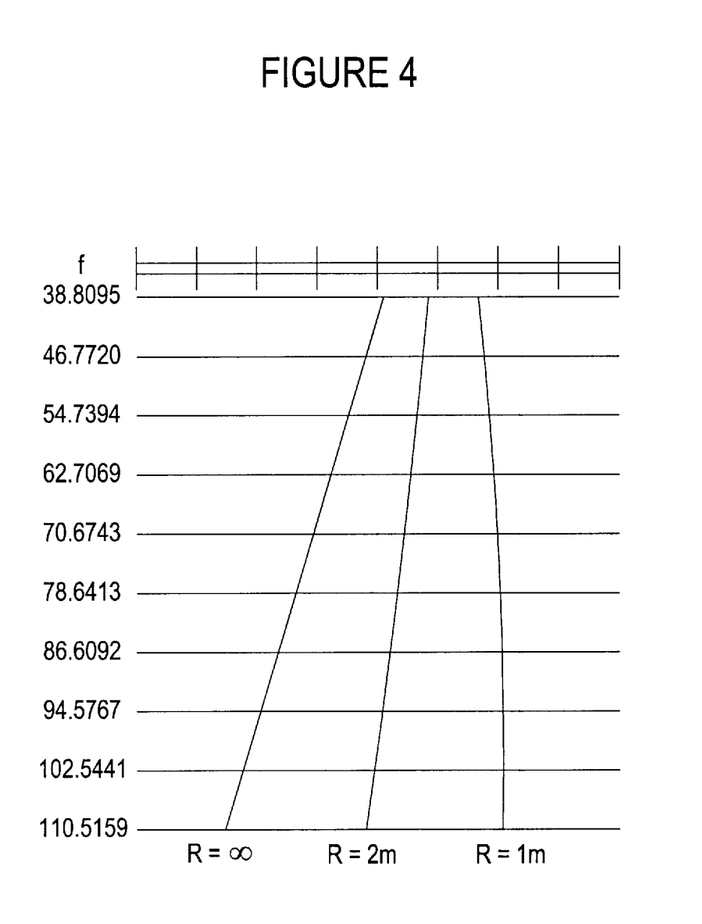
FIG. 4 is a drawing showing the relative movement of the lens groups G2 and G4, located on either side of the focusing lens unit G3, at each focal length condition when the photographic distance R is infinity, 2 m, and 1 m according to one embodiment of the present invention.

FIG. 4 shows the relative movement of the lens groups G2 and G4, which are on either side of the focusing lens unit G3, at each focal length conditions when the photographic distance R is infinity, 2 m, and 1 m. In FIG. 4, the left end of the drawing shows the position of the second lens group G2, and the right end of the drawing shows the position of the fourth lens group G4. Because the second lens group G2 and the fourth lens group G4 move as a single body when the focal length of the lens system changes, the distance between the second lens group G2 and the fourth lens group G4 at the optical axis remains fixed.

As shown in FIG. 4, for the first embodiment, as the focal length of the lens system changes from the wide-angle end (top of the drawing) to the telephoto end (bottom of the drawing), the movement amount for each photographic distance of the third lens unit G3, which is the focusing lens unit, increases monotonically and gradually.

Figure 3:
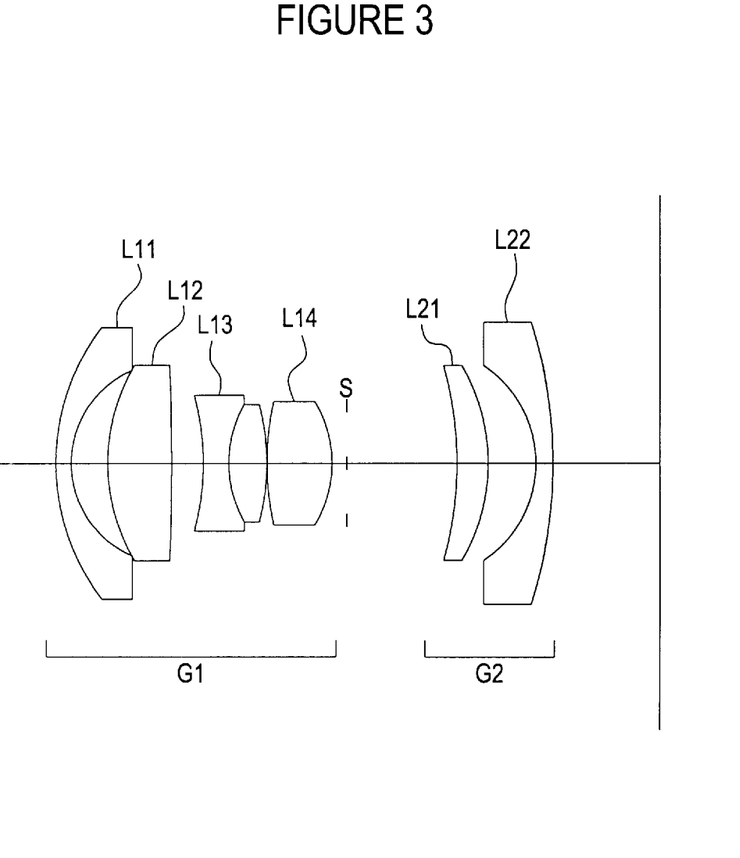
FIG. 3 is a drawing showing the lens structure of the lens system with a variable focal length of the position controlling device according to another embodiment of the present invention.

FIG. 3 shows the structure of a lens system with a variable focal length of the position controlling device according to the second embodiment. The lens system with a variable focal length of the second embodiment includes, in order from the object side, a first lens group G1 with a positive refractive power and a second lens group G2 with a negative refractive power. When the focal length of the lens system changes from the wide-angle end to the telephoto end, the distance decreases between the first lens group G1 and the second lens group G2.

In order from the object side, the first lens group G1 includes a negative meniscus lens component L11 with a convex surface facing the object side, a biconvex lens component L12, a compound lens component L13 with a biconcave lens and a biconvex lens, and a biconvex lens component L14. The second lens group G2 includes, in order from the object side, a positive meniscus lens component L21 with a convex surface facing the image side and a negative meniscus lens component L22 with a convex surface facing the image side.

An aperture stops is arranged between the first lens group G1 and the second lens group G2. The aperture stop moves as one piece with the first lens group G1 as the focal length of the lens system changes from the wide-angle end to the telephoto end.

In the second embodiment, the entire lens system is moved along the optical axis to perform the focusing action.

The values of the items of the second embodiment are in Table (3). In Table (3), f is the focal length and Bf the back focus. The surface number indicates the order of the lens surface from the object side in the direction of the incident light rays. The values of the index of refraction and the Abbe number are each shown for the d-line (λ=587.6 nm).

TABLE 3

| surface number | radius of curvature | space between surfaces | index of refraction | Abbe number |
| --- | --- | --- | --- | --- |
| 1 | 19.1728 | 1.400 | 1.77279 | 49.45 |
| 2 | 8.7151 | 3.100 | | |
| 3 | 16.3784 | 5.600 | 1.59507 | 35.51 |
| 4 | −144.5355 | 2.700 | | |
| 5 | −22.9378 | 2.200 | 1.80454 | 39.61 |
| 6 | 10.5801 | 3.300 | 1.58913 | 61.30 |
| 7 | −19.1814 | 0.100 | | |
| 8 | 37.4136 | 5.600 | 1.51860 | 69.98 |
| 9 | −10.8001 | 1.200 | | |
| 10 | ∞ | (d10 = variable) | (aperture stop S) | |
| 11 | −21.8194 | 2.600 | 1.74330 | 49.32 |
| 12 | −16.3633 | 4.200 | | |
| 13 | −9.2891 | 1.400 | 1.74810 | 52.30 |
| 14 | −35.6013 | Bf | | |

(variable space at the changing of the focal length of the lens system)

| f | d10 | Bf |
| --- | --- | --- |
| 24.7000 | 9.5258 | 8.9348 |
| 25.9859 | 8..7524 | 10.6285 |
| 27.3388 | 8.0172 | 12.4105 |
| 28.7620 | 7.3185 | 14.2851 |
| 30.2594 | 6.6543 | 16.2575 |
| 31.8347 | 6.0229 | 18.3324 |
| 33.4921 | 5.4228 | 20.5155 |
| 35.2357 | 4.8524 | 22.8121 |
| 37.0701 | 4.3103 | 25.2283 |
| 39.000 | 3.7949 | 27.7703 |

In Table (4), the focusing movement amounts γ are shown opposite the movement amounts δ of the first lens group G1 for the photographic distances R=1 m and R=2 m. The movement amounts δ of the first lens group G1 are taken with the wide-angle end as the standard position and with movement toward the object side taken to be positive. The focusing movement amount γ is positive in the image side direction.

TABLE 4

(Focusing movement amount)

| f | δ | γ (R = 2 m) | γ (R = 1 m) |
| --- | --- | --- | --- |
| 24.7000 | 0.0000 | 0.3162 | 0.6568 |
| 25.9859 | 0.9203 | 0.3504 | 0.7285 |
| 27.3388 | 1.9671 | 0.3882 | 0.8082 |
| 28.7620 | 3.1430 | 0.4302 | 0.8968 |
| 30.2594 | 4.4511 | 0.4768 | 0.9953 |
| 31.8347 | 5.8947 | 0.5285 | 1.1050 |

TABLE 4-continued (Focusing movement amount)

| f | δ | γ (R = 2 m) | γ (R = 1 m) |
|---|---|---|---|
| 33.4921 | 7.4777 | 0.5858 | 1.2270 |
| 35.2357 | 9.2039 | 0.6495 | 1.3628 |
| 37.0701 | 11.0779 | 0.7201 | 1.5141 |
| 39.0000 | 13.1046 | 0.7985 | 1.6826 |

In the second embodiment, the focusing movement amount γ is calculated using approximation Formula (2) where the movement amount of the first lens group G1 is δ, and the reciprocal (1/R) of the photographic distance R is α. In other words, the focusing movement amount γ is calculated through the approximation Formula (4).

$$\gamma = (a_{10} + a_{11}\delta + a_{12}\delta^2 + a_{13}\delta^3) * R^{-1} + \quad (4)$$
$$(a_{20} + a_{21}\delta + a_{22}\delta^2 + a_{23}\delta^3) * R^{-2} +$$
$$(a_{30} + a_{31}\delta + a_{32}\delta^2 + a_{33}\delta^3) * R^{-3}$$

$a_{10}=0.618900\times10^{0}$
$a_{11}=0.657539\times10^{-1}$
$a_{12}=0.231703\times10^{-3}$
$a_{13}=0.271754\times10^{-5}$
$a_{20}=0.409157\times10^{-1}$
$a_{21}=0.584359\times10^{-2}$
$a_{22}=0.251863\times10^{-4}$
$a_{23}=0.263944\times10^{-5}$
$a_{30}=0.491180\times10^{-2}$
$a_{31}=0.967546\times10^{-3}$
$a_{32}=0.418951\times10^{-4}$
$a_{33}=0.119700\times10^{-5}$ As shown in Table (4), on the lens system with a variable focal length of the second embodiment, when the focal length of the lens system changes from the wide-angle end to the telephoto end, the movement amount δ of the first lens group G1 moves monotonically to the object side, and the focusing movement amount γ changes monotonically for each photographic distance. Therefore, the required focusing movement amount γ for the lens system with a variable focal length can be directly and precisely obtained by simply substituting the movement amount δ and the photographic distance R of the first lens group G1 into a simple formula, such as approximation Formula (4).

In Formula (4), a third-order polynomial expression was used for δ, but a first-order, second-order, or higher-order polynomial expression could be used. In Formula (1), a third-order expression was used for 1/R, but a first-order, second-order, or higher-order polynomial expression may also be used.

Again, when the order of the polynomial expressions for δ and R is small, the calculations are faster and require less recorded information. However, higher order polynomial expressions improve focusing accuracy.

Additionally, the disclosed embodiments use the reciprocal 1/R of the photographic distance R as the photographic distance information. However, the value of the photographic distance R itself, which is obtained by the distance measuring device 9, may be used. Further, the focusing movement amount γ can be calculated using the angle of rotation of the lens barrel.

The disclosed embodiments use a lens system with a variable focal length on which image position is fixed during variation of the focal length of the lens system, but the present invention also applies to a variable focal lens where image position is variable during variation of the focal length of the lens system.

The present invention is not limited to a lens system with a variable focal length that performs focusing with a lens group that is one portion of the lens system, but also applies to a lens system with a variable focal length that carries out focusing with the entire lens system.

As many different embodiments of this invention may be made and used without departing from the spirit and scope, it is understood that the invention is not limited to the specific embodiments.

What is claimed is:

1. A position controlling device of a lens system with a variable focal length; comprising:
   a distance measuring device that detects a position of an object and outputs photographic distance information;
   at least one movable lens unit, said at least one movable lens unit including a first movable lens unit that is movable to change the focal length of the lens system;
   a detecting device that detects an amount of movement from a standard position of said first movable lens unit when the focal length of the lens system is changed and outputs said movement amount;
   a focusing lens unit that is movable for focusing;
   a calculating device that directly calculates a required movement γ of said focusing lens unit using said photographic distance information received from said distance measuring device and said movement amount received from said detecting device and outputs said required movement γ; and
   a controlling device that drives said focusing lens unit to perform focusing of said lens system, based on said required movement γ received from said calculating device,
   wherein said required movement γ of said focusing lens unit increases monotonically and gradually throughout the change of the focal length of the lens system from a wide-angle end to a telephoto end for each of a plurality of predetermined photographic distances.

2. A position controlling device according to claim 1, wherein said calculating device calculates said required movement γ of said focusing lens unit, based on the following formula:

$$\gamma=\Sigma_i\Sigma_j a_{ij}(1/R)^i\delta^j (i=1,2,3,\ldots,j=0,1,2,\ldots)$$

where R is said photographic distance information, δ is said movement amount of said first movable lens unit, and $a_{ij}$ are fixed coefficients.

3. A position controlling device according to claim 2, wherein said first movable lens unit moves monotonically between a position toward an object side and a position toward an image side.

4. A position controlling device according to claim 2, wherein said required movement γ of said focusing lens unit increases monotonically and gradually when the focal length of the lens system changes from a wide-angle end to a telephoto end for each of a plurality of predetermined photographic distances.

5. A position controlling device according to claim 2, wherein said detecting device detects said movement amount from said standard position of said first movable lens unit when the focal length of the lens system is changed.

6. A position controlling device according to claim 2, wherein δ is detected from an angle of rotation of a zoom lens barrel.

7. A position controlling device according to claim 2, wherein said photographic distance information is variable when said focal length of the lens system changes.

8. A position controlling device according to claim 7, wherein said first movable lens unit moves monotonically between a position toward an object side and a position toward an image side, and wherein said required movement γ of said focusing lens unit increases monotonically and gradually when the focal length of the lens system changes from a wide-angle end to a telephoto end for each of a plurality of predetermined photographic distances.

9. A position controlling device according to claim 1, wherein said first movable lens unit moves monotonically between a position toward an object side and a position toward an image side when the focal length of the lens system is changed.

10. A position controlling device according to claim 9, wherein said required movement γ of said focusing lens unit increases monotonically and gradually when the focal length of the lens system changes from a wide-angle end to a telephoto end for each of a plurality of predetermined photographic distances.

11. A position controlling device according to claim 9, wherein said detecting device detects said movement amount from said standard position of said first movable lens unit when the focal length of the lens system is changed.

12. A position controlling device according to claim 1, wherein said required movement γ of said focusing lens unit increases monotonically and gradually when the focal length of the lens system changes from a wide-angle end to a telephoto end for each of a plurality of predetermined photographic distances.

13. A position controlling device according to claim 1, wherein said detecting device detects said movement amount from said standard position of said first movable lens unit when the focal length of the lens system is changed.

14. A position controlling device of a lens system with a variable focal length, comprising:

distance measuring means for detecting a position of an object and for outputting photographic distance information;

at least one movable lens unit, said at least one movable lens unit including a first movable lens unit that is movable to change the focal length of the lens system;

detecting means for detecting an amount of movement from a standard position of said first movable lens unit when a focal length of the lens system is changed and for outputting said movement amount;

a focusing lens unit that is movable for focusing;

calculating means for directly calculating a required movement γ of said focusing lens unit using said photographic distance information and said movement amount and then outputting said required movement γ; and controlling means for driving said focusing lens unit to perform focusing of said lens system, based on said required movement γ, wherein said photographic distance information is fixed when said focal length of the lens system changes, and wherein said required movement of said focusing lens unit increases monotonically and gradually throughout the change of the focal length of the lens system from a wide-angle end to a telephoto end for each of a plurality of predetermined photographic distances.

15. A position controlling device according to claim 14, wherein said calculating means calculates said required movement γ of said focusing lens unit, based on the following formula:

$$\gamma = \Sigma_i \Sigma_j a_{ij} (1/R)^i \delta^j (i=1,2,3,\ldots, j=0,1,2,\ldots)$$

where R is said photographic distance information, δ is said movement amount of said one of said first movable lens unit, and $a_{ij}$ are fixed coefficients.

16. A position controlling device according to claim 14, wherein said first movable lens unit moves monotonically between a position toward an object side and a position toward an image side.

17. A position controlling device according to claim 15, wherein δ is detected from an angle of rotation of a zoom lens barrel, and wherein said photographic distance information is variable when said focal length of the lens system changes.

18. A position controlling device according to claim 17, wherein said required movement γ of said focusing lens unit increases monotonically and gradually when the focal length of the lens system changes from a wide-angle end to a telephoto end for each of a plurality of predetermined photographic distances.

19. A position controlling device according to claim 14, wherein said first movable lens unit moves monotonically between a position toward an object side and a position toward an image side when the focal length of the lens system is changed.

20. A position controlling device according to claim 14, wherein said required movement of γ said focusing lens unit increases monotonically and gradually when the focal length of the lens system changes from a wide-angle end to a telephoto end for each of a plurality of predetermined photographic distances, and wherein said detecting device detects said movement amount from said standard position of said first movable lens unit when the focal length of the lens system is changed.

21. A method of controlling a lens position of a lens system with a variable focal length having at least one movable lens unit and a focusing lens unit, the method comprising the steps of:

detecting a position of an object and outputting photographic distance information;

moving a first movable lens unit of said at least one movable lens unit to change the focal length of the lens system;

detecting an amount of movement from a standard position of said first movable lens unit when a focal length of the lens system is changed and outputting said movement amount;

directly calculating and outputting a required movement γ of said focusing lens unit using said photographic distance information and said movement amount; and driving said focusing lens unit to perform focusing of said lens system, based on said required movement γ, wherein said photographic distance information is fixed when said focal length of the lens system changes, and wherein said moving step comprises increasing moving monotonically and gradually when the focal length of the lens system changes from a wide-angle end to a telephoto end for each of a plurality of predetermined photographic distances, and wherein said driving step comprises increasing driving monotonically and gradually throughout the chance of the focal length of the lens system from a wide-angle end to a telephoto end for each of the plurality of predetermined photographic distances.

22. The method of claim 21, wherein said calculating step comprises calculating said required movement γ of said focusing lens unit, based on the following formula:

$\gamma = \Sigma_i \Sigma_j a_{ij}(1/R)^i \delta^j (i=1,2,3,\ldots, j=0,1,2,\ldots)$ where R is said photographic distance information, δ is said movement amount of said first movable lens unit, and $a_{ij}$ are fixed coefficients.

23. The method of claim 21, wherein said moving step comprises moving said first movable lens unit monotonically between a position toward an object side and a position toward an image side.

24. The method of claim 22, further comprising detecting δ from an angle of rotation of a zoom lens barrel, wherein said photographic distance information is variable when said focal length of the lens system changes.

25. The method of claim 21, wherein said moving step comprises monotonical movement between a position toward an object side and a position toward an image side when the focal length of the lens system changes.

26. The method of claim 21, wherein said driving step comprises increasing driving monotonically and gradually when the focal length of the lens system changes from a wide-angle end to a telephoto end for each of a plurality of predetermined photographic distances, and wherein said detecting step comprises detecting said movement amount from said standard position of said first movable lens unit when the focal length of the lens system is changed.

27. A position controlling device of a lens system with a variable focal length, comprising:

a distance measuring device that detects a position of an object and outputs photographic distance information;

at least one movable lens unit, said at least one movable lens unit including a first movable lens unit that is movable to change the focal length of the lens system;

a detecting device that detects an amount of movement from a standard position of said first movable lens unit when the focal length of the lens system is changed and outputs said movement amount;

a focusing lens unit that is movable for focusing;

a calculating device that directly calculates a required movement γ of said focusing lens unit using said photographic distance information received from said distance measuring device and said movement amount received from said detecting device and outputs said required movement γ; and a controlling device that drives said focusing lens unit to perform focusing of said lens system, based on said required movement γ received from said calculating device, wherein said required movement γ of said focusing lens unit increases monotonically and gradually when the focal length of the lens system from a wide-angle end to a telephoto end for each of a plurality of predetermined photographic distances, the required movement γ being smaller at the wide-angle end than at the telephoto end.

28. A position controlling device of a lens system with a variable focal length, comprising:

distance measuring means for detecting a position of an object and for outputting photographic distance information;

at least one movable lens unit, said at least one movable lens unit including a first movable lens unit that is movable to change the focal length of the lens system;

detecting means for detecting an amount of movement from a standard position of said first movable lens unit when a focal length of the lens system is changed and for outputting said movement amount;

a focusing lens unit that is movable for focusing;

calculating means for directly calculating a required movement γ of said focusing lens unit using said photographic distance information and said movement amount and then outputting said required movement γ; and controlling means for driving said focusing lens unit to perform focusing of said lens system, based on said required movement γ, wherein said photographic distance information is fixed when said focal length of the lens system changes, and wherein said required movement of said focusing lens unit increases monotonically and gradually when the focal length of the lens system changes from a wide-angle end to a telephoto end for each of a plurality of predetermined photographic distances, the required movement γ being smaller at the wide-angle end than at the telephoto end.

29. A method of controlling a lens position of a lens system with a variable focal length having at least one movable lens unit and a focusing lens unit, the method comprising the steps of:

detecting a position of an object and outputting photographic distance information;

moving a first movable lens unit of said at least one movable lens unit to change the focal length of the lens system;

detecting an amount of movement from a standard position of said first movable lens unit when a focal length of the lens system is changed and outputting said movement amount;

directly calculating and outputting a required movement γ of said focusing lens unit using said photographic distance information and said movement amount; and driving said focusing lens unit to perform focusing of said lens system, based on said required movement γ, wherein said photographic distance information is fixed when said focal length of the lens system changes, and wherein said moving step comprises increasing moving monotonically and gradually when the focal length of the lens system changes from a wide-angle end to a telephoto end for each of a plurality of predetermined photographic distances, and wherein said driving step comprises increasing driving monotonically and gradually when the focal length of the lens system changes from a wide-angle end to a telephoto end for each of the plurality of predetermined photographic distances, the required movement γ being smaller at the wide-angle end than at the telephoto end.

* * * * *